United States Patent [19]

Silverman et al.

[11] Patent Number: 5,077,665
[45] Date of Patent: Dec. 31, 1991

[54] DISTRIBUTED MATCHING SYSTEM

[75] Inventors: David L. Silverman, Nesconset; Alfred H. Scholldorf, Port Jefferson Station; Norman Keller, Mt. Sinai, all of N.Y.

[73] Assignee: Reuters Limited, England

[21] Appl. No.: 357,036

[22] Filed: May 25, 1989

[51] Int. Cl.$^5$ .............................................. G06F 15/20
[52] U.S. Cl. .................................... 364/408; 364/401
[58] Field of Search ...................... 364/408, 401, 514

[56] References Cited

U.S. PATENT DOCUMENTS

| | | | |
|---|---|---|---|
| 3,573,747 | 4/1971 | Adams et al. | 340/172.5 |
| 3,581,072 | 5/1971 | Nymeyer | 235/152 |
| 4,412,287 | 10/1983 | Braddock, III | 364/408 |
| 4,674,044 | 6/1987 | Kalmus et al. | 364/408 |
| 4,677,552 | 6/1987 | Sibley, Jr. | 364/408 |
| 4,745,559 | 5/1988 | Willis et al. | 364/514 |
| 4,750,135 | 6/1988 | Boilen et al. | 364/514 |
| 4,868,866 | 9/1989 | Williams, Jr. | 380/49 |

FOREIGN PATENT DOCUMENTS

| | | | |
|---|---|---|---|
| 1489571 | 10/1977 | United Kingdom | 364/408 |
| 1489573 | 10/1977 | United Kingdom | 364/408 |

*Primary Examiner*—Jerry Smith
*Assistant Examiner*—Russell E. Cass
*Attorney, Agent, or Firm*—Bryan, Cave, McPheeters & McRoberts

[57] ABSTRACT

A matching system for trading instruments is provided in which bids are automatically matched against offers for given trading instruments for automatically providing matching transactions in order to complete trades for the given trading instruments in which controllable subsets (110, 112) of a distributable system trading book (118) may be selectively provided to trading keystations (24) in the matching system from the host computer (20) or central system for dynamically controllably masking the available trading market. The system comprises the host computer (20) for maintaining a host book data base (118) comprising all of the active bids and offers in the system by trading instrument, a transaction originating keystation (24a) at a client site (26) for providing a bid on a given trading instrument to the system for providing a potential matching transaction, a counterparty keystation (24b) for providing an offer on the given trading instrument involved in the potential matching transaction, and a network (22) for interconnecting the host computer (20), the transaction originating keystation (24a) and the counterparty keystation (24b) in the system for enabling data communication therebetween. Both the transaction originating keystation (24a) and the counterparty keystation (24b) each have an associated local data base keystation book (110, 112) comprising a subset of the host book (118). The content of each of the keystation books (110, 112) has an associated display depth range which is dynamically controllable by the host computer (20) and is dynamically updatable by transaction update broadcast messages (132) received from the host computer (20) through the network (22) which is preferably transparent to the transactions communicated.

57 Claims, 13 Drawing Sheets

CENTRAL STATION BOOK

KEYSTATION BOOK

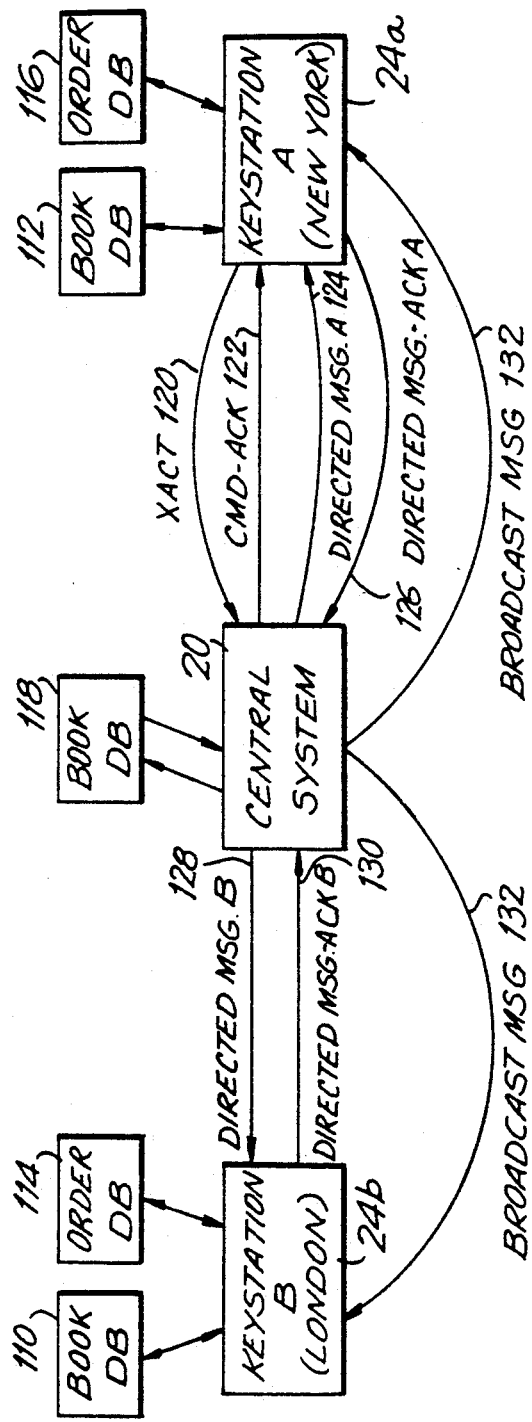

FIG. 7

| FIELD | BYTE | FIELD NAME | SIZE | TYPE |
|---|---|---|---|---|
| 1 | 0 | PROTOCOL TYPE | 01 | BYTE |
| 2 | 1 | SERVICE ID | 01 | BYTE |
| 3 | 2 | TIME STAMP | 04 | TIME TYPE |
| 4 | 6 | MESSAGE CLASS | 01 | ENUM |
| 5 | 7 | KEYSTATION ADDRESS | 04 | ADDRESS TYPE |
| 6 | 11 | MSG. SEQUENCE NUMBER | 02 | WORD |

FIG. 8

| 7 | 13 | MESSAGE TYPE | 01 | ENUM |
|---|---|---|---|---|
| 8 | 14 | MESSAGE GROUP | 01 | ENUM |
| 9 | 15 | HOST XACT NUMBER | 04 | LONGWORD |
| 10 | 19 | IxM TOKEN | 04 | LONGWORD |
| 11 | 23 | UPDATE IDENTIFIER | 01 | ENUM |
| 12 | 24 | IxM SEQUENCE NUMBER | 01 | BYTE |
| 13 | 25 | RFR STATE | 01 | ENUM |
| 14 | 26 | TRADE WORKUP QUANTITY | 04 | QUANTITY TYPE |
| 15 | 30 | BLOCK LIST SIZE | 01 | BYTE |
| 16 | 31 | NUMBER OF HIGHS | 01 | BYTE |
| 17 | 32 | NUMBER OF LOWS | 01 | BYTE |
| 18 | 33 | NUMBER OF TRADES | 01 | BYTE |
| 19 | 34 | NUMBER OF OPERATIONS | 01 | BYTE |

FIG. 9

HIGH BLOCK

| FIELD | BYTE | FIELD NAME | SIZE | TYPE |
|---|---|---|---|---|
| 1 | 0 | HIGH QUOTE | 08 | QUOTE TYPE |

FIG. 10

LOW BLOCK

| FIELD | BYTE | FIELD NAME | SIZE | TYPE |
|---|---|---|---|---|
| 1 | 0 | LOW QUOTE | 08 | QUOTE TYPE |

FIG. 11

TRADE BLOCK

| FIELD | BYTE | FIELD NAME | SIZE | TYPE |
|---|---|---|---|---|
| 1 | 0 | TRADE QUOTE | 08 | QUOTE TYPE |
| 2 | 8 | TRADE QUANTITY | 04 | QUANTITY TYPE |

FIG. 12

OPERATION BLOCK

| FIELD | BYTE | FIELD NAME | SIZE | TYPE |
|---|---|---|---|---|
| 1 | 0 | OPERATION CODE | 01 | ENUM |
| 2 | 1 | INDEX | 01 | BYTE |
| 3 | 2 | ENTRY TYPE | 01 | ENUM |
| 4 | 3 | ENTRY QUOTE | 08 | QUOTE TYPE |
| 5 | 11 | QUANTITY | 04 | QUANTITY TYPE |
| 6 | 15 | QUANTITY ATTRIBUTE | 01 | ENUM |

FIG. 15

```
                TIME ORDER
     FIRST ←── OF OFFERS ──→ LAST
     ┌──────┬──────┬──────┐    ┌──────┐
     │139.70│139.70│139.70│    │139.70│
     │  2.0 │  6.0 │  5.0 │    │  5.0 │
     └──────┴──────┴──────┘    └──────┘
                TIME ORDER
     FIRST ←── OF OFFERS ──── LAST
     ┌──────┬──────┬──────┬──────┐
     │139.70│139.70│139.70│139.70│
     │  2.0 │  6.0 │  5.0 │  5.0 │
     └──────┴──────┴──────┴──────┘
```

OFFER IS POSITIONED AS LAST ENTRY IN TIME ORDER IN THE SUB-BOOK. ASSUME NORMAL MATCHING LOGIC.

FIG. 16

```
                TIME ORDER
     FIRST ←── OF OFFERS ──── LAST
     ┌──────┬──────┬──────┐    ┌──────┐
     │139.70│139.70│139.70│    │139.61│
     │  2.0 │  6.0 │  5.0 │    │  5.0 │
     └──────┴──────┴──────┘    └──────┘
  TIME ORDER OF OFFERS
    FIRST
   ┌──────┐
   │139.61│
   │  5.0 │
   └──────┘
```

OFFER IS POSITIONED AS FIRST ENTRY IN TIME ORDER IN THE SUB-BOOK

ORIGINAL OFFERS CANCELLED AND REMOVED FROM BOOK.

1

DISTRIBUTED MATCHING SYSTEM

CROSS-REFERENCE TO RELATED APPLICATIONS

This application is related to the commonly owned co-pending U.S. Patent Application entitled "Distributed Matching System Method", contemporaneously filed herewith and naming the applicants herein as joint-inventors thereof, the contents of which is specifically incorporated by reference herein in its entirety.

TECHNICAL FIELD

The present invention relates to matching systems for effectuating trades of trading instruments through automatic matching in which buyers and sellers who are willing to trade with one another based on specified criteria may automatically trade when matching events occur satisfying these criteria, and more particularly to such matching systems in which the book of bids and offers may be distributed under control of the central system or host computer, to the participating keystations or client sites in the system.

BACKGROUND ART

Information retrieval systems for financial information, such as stock market type of information and money market information, normally employ a transfer of data in a high-performance, real-time information retrieval network in which update rates, retrieval rates and subscriber and/or user population are generally very high. An example of such a system is REUTERS DEALING SERVICE which is used in the foreign exchange or money market. Such systems, while providing rapid video conversation capability, are not anonymous systems nor do they provide for automated anonymous trading such as is possible in a matching system. Of course, conversational dealing systems have their place in the market and serve particular needs where appropriate. However, anonymous matching systems are also often desired and, by their very nature, do not normally employ a conversation capability since the parties to the transactions are unknown until the transaction has been completed. Examples of satisfactory prior art video conversational systems for use in connection with trading of financial information are disclosed in commonly owned U.S. Pat. Nos. 4,531,184; 4,525,779 and 4,404,551, by way of example. Prior art examples of matching systems used in connection with the trading of trading instruments are disclosed in U.S. Pat. No. 4,412,287, which discloses as an automated stock exchange in which a computer matches buy and sell orders for a variety of stocks; U.S. Pat. No. 3,573,747, which discloses an anonymous trading system for selling fungible properties between subscribers to the system; U.S. Pat. No. 3,581,072, which discloses the use of a special purpose digital computer for matching orders and establishing market prices in an auction market for fungible goods; and U.S. Pat. No. 4,674,044, which discloses an automated securities trading system. However, none of these prior art matching systems implements or suggests the use of a broadcast capability for messages from the host computer or central system which is employed to update a trading book of bids and offers locally stored at the keystations to provide restricted subsets of the host book at these keystations. In Addition, no prior art matching systems are known to applicants in which directed messages are employed between the keystations in the system and the central system to update the local entry order data bases and broadcast messages are employed to update the keystation book which is a restricted subset of the host or central system book. Moreover, none of these prior art system employ summary books at the local keystations as subsets of the host or central system book.

In the system of the present invention, as opposed to the prior art known to applicants, the central system maintains a data base consisting of all of the trading instruments available for trade, credit information, and the bids and offers that are present throughout the system, while the client sites or keystations maintain copies of only the best bids and offers and use those to generate a display. Thus, the client sites have some restricted subset of the total depth of the system book located at the central data base. By transmitting only subsets of the total system book from the host, the amount of network overhead that is required is significantly reduced, which reduction is further enhanced by the use of only summary information in the keystation books. Moreover, this enables the central data base maintaining a full set of information for every entry including identification of the parties which identification is not to be provided for the subset books at the keystations in an anonymous trading system. The only time that the keystation is made aware of the parties involved in the transaction is after the transaction has been completed. Thus, in the system of the present invention, the host may enforce a structure on the client site data bases which is the maximum depth of displayable queue or display depth for a particular trading instrument. By a single parameter change at the host or central system, the view of the trading instrument throughout the entire matching system "world" can be effectively changed. For example, if the host system sets the display depth equal to one, then none of the keystations would be able to look further into the book. If desired, this procedure can be dynamically varied from the host so that at given times or given days different aspects of the trading environment can be displayed. Although, dynamic control of the content of a local receiver data base from a transmitted data base in an information retrieval communication network has been previously employed by applicants assignee such as disclosed in U.S. Pat. Nos. 4,745,559 and 4,750,135, these systems are different from the type of system control employed in the system of the present invention in which restricted subsets of the host book are maintained as summary books at the keystation local data bases. Thus, the system of the present invention for providing a distributed matching system overcomes the disadvantages of the prior art.

DISCLOSURE OF THE INVENTION

A matching system for trading instruments is provided in which bids are automatically matched against offers for given trading instruments for automatically providing matching transactions in order to complete trades for the given trading instruments in which controllable subsets of a distributable system trading book may be selectively provided to trading keystations in the matching system from the host computer or central system for controllably masking the available trading market. The system comprises the host computer for maintaining a host book data base comprising all of the active bids and offers in the system by trading instrument, a transaction originating keystation at a client site for providing a bid on a given trading instrument to the system for providing a potential matching transaction, a counterparty keystation for providing an offer on the given trading instrument involved in the potential matching transaction, and a network for interconnecting the host computer, the transaction originating keystation and the counterparty keystation in the system for enabling data communication therebetween. Both the transaction originating keystation and the counterparty keystation, which of course can comprise more than one counterparty for a given transaction, for the potential matching transaction each have an associated local data base keystation book comprising a subset of the host book. The content of each of the keystation books has an associated display depth range which in controllable by the host computer and is updatable by transaction update broadcast messages received from the host computer through the network. The network is preferably transparent to the transactions communicated via the network. The transaction originating keystations and the counterparty keystation or keystations comprise means responsive to the received transaction update broadcast messages for updating the associated keystation books and further comprise means for providing directed messages to the host computer corresponding to the bid and the offer, respectively. The directed messages are processed and used to update the host book. The host computer comprises means for conditionally providing the transaction broadcast update messages to the keystations in the system in response to the presence of an update condition. The update condition comprises updating of the host book and the received bid or offer having a relative value compared with other bids or offers within the host book, which is within the keystation book display depth range of relative values. Preferably the host computer processes the matching transaction for a given trading instrument in time order entry to the matching system. The subset keystations books preferably comprise accumulated summaries of corresponding bids and offers in the host book, with the summaries comprising an accumulation of common price bids and an accumulation of common price offers. Preferably, the bids and offers comprise logical data. Tokens are used in the system for transmission of the data with respect to users and other information. The keystation book, as was previously mentioned, comprises displayable data having a defined keystation book display depth range, such as the best bid or offer, the next best bid or offer, and so forth, and bids and offers which fall outside that display depth range are not displayed. Thus, the keystation books each comprise a restricted subset of the total depth of the host book with respect to the best bids and offers present in the host book data base. These bids and offers contained in the keystation books are anonymous prior to the completion to the matching transaction. In this regard, preferably a display depth of one for the keystation books would prevent looking into the host book at the keystation. In the system of the present invention, the broadcast messages from the host or central system are broadcast to all of the keystations in the matching system and are used to update the keystation books whereas the directed messages which are sent from the central system or host are directed back only to the keystations involved in the actual matching transaction. These directed messages are used to update the local entry data base or order book at the local keystations involved in the transaction so as to indicate what has happened to the offer or bid at that particular keystation made in the connection with the matching transaction. Thus, by employing the distributed matching system of the present invention, controllable subsets of a distributable system trading book may be selectively provided to the various trading keystations in the matching system from the host or central system in order to controllably mask the available trading market and efficiently transmit only the required matching information to those keystations which require it.

BRIEF DESCRIPTION OF DRAWINGS

FIG. 6 is a functional block diagram illustrating the flow of information in the system of the present invention in connection with a typical matching transaction;

FIGS. 7-12 are illustrative diagrams of a typical IXM update broadcast message structure in accordance with the system of the present invention;

FIG. 15 is an illustration similar to FIG. 4 of an auction market entry position, market equal, based on the book of FIG. 4;

FIG. 16 is an illustrative diagram similar to FIG. 15 of the auction market entry position, with the market bettered, based on the book of FIG. 4;

BEST MODE FOR CARRYING OUT THE INVENTION

Figure 1:
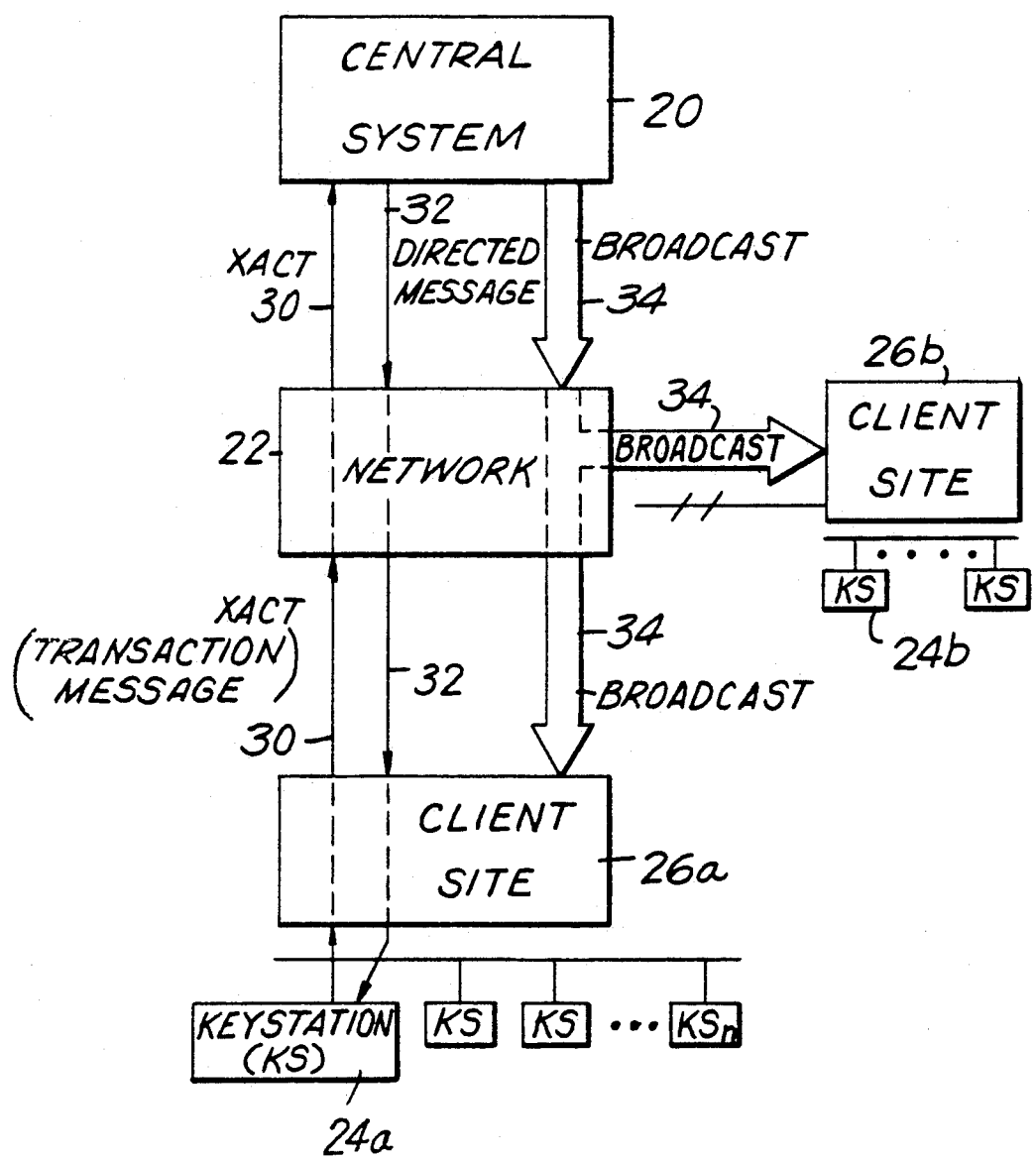
FIG. 1 is an overall system functional block diagram of the distributed matching system of the present invention.

Referring now to to drawings in detail and initially to FIG. 1 thereof, the system of the present invention is a distributed anonymous matching system for use in trading various trading instruments, such as different foreign exchange currencies. In the system of the present invention as described herein, the trading is effectuated through anonymous matching as opposed to through the conversation video system described in U.S. Pat. Nos. 4,531,184; 4,525,779; and 4,404,551, commonly owned by applicants' assignee herein. Thus, the distributed matching system of the present invention may be thought of as a computerized exchange in which its central role is to identify a buyer and a seller who are willing to trade with one another based on specified criteria, such as price, quantity and credit. When such a matching event occurs, preferably the buyer and seller are informed of the trade and sufficient information is then provided to them to complete the physical clearing of the transaction. In order to support this central function, the matching system requires various support functions one of which is preferably the maintenance of summary market information on the participant's work-station or keystation displays at the various client sites. Preferably in the system of the present invention, at all times the system will display the best inside price for every instrument traded on the system. The best inside price is preferably defined to be the highest value bid and the lowest value offer in the system. Preferably the prices are displayed together with the quantity bid or offered at the specified price so that the trader at the keystation can observe the market activity.

By observing the market activity, the trader can decide whether to enter a bid, or enter an offer into the market in an effort to complete a matching transaction. Preferably, the anonymous matching system of the present invention essentially maintains a book of bids and offers in the central system 20 or host computer. A user or keystation at a client site, such as client site 26a or 26b illustrated in FIG. 1, by way of example, interacts with the book by submitting bid, offer, hit, or take transactions. The order entry function is preferably conventionally achieved through data entry using a conventional keyboard, pointing device such as a mouse or any other conventional data entry tool. The central system 20 validates the transaction request, processes the bid, offer, hit or take according to the rules of the market, and attempts to find matches between this new entry and the other bids and offers posted in the system book. If a match is found, then the trade is automatically executed, the participants to the trade are informed, all databases and trader screens are updated as to the quantities traded and the quantities remaining and, if desired, a clearing agency may be informed as to the details of the trade so that payments and exchanges may be completed. If, on the other hand, a match cannot be found, then the system preferably either disposes of the entry for hit or take or keeps the entry for bid or offer for later processing. Preferably in all cases transactions are processed to completion according to certain rules and the various client sites 26a, 26b preferably receive real-time updates of the new status of the trading instruments. Thus, as shown and preferred in FIG. 1, the client site systems 26a and 26b only two of which are shown by way of example in FIG. 1, submit transactions, such as represented by reference numeral 30, to the central system 20 via the communication network 22. As will be explained in greater detail hereinafter with reference to FIG. 6, the submission of a transaction 30 from a client site 26a or 26b to the central system 20 will preferably result in one or more messages, represented by reference numeral 32, going directly back as a directed message to the client site 26a in this example, which initiated the transaction message. Another effect of the transaction message 30 being sent to the central system 20 is that for certain sorts of transactions, a broadcast message 34 is generated by the central system 20 which is then delivered to all client sites 26a, 26b attached to the central system 20. Thus, the directed response or the directed message 32 only goes back to the particular client site 26a and, more particularly, the particular keystation, 24a by way of example, at that client site 26a which initiated the transaction message whereas the broadcast message 34 goes to all client sites 26a, 26b and all of the various keystations associated at those client sites 26a, 26b. By way of example, in FIG. 1 a typical client site 26a is shown as having keystations 24a, 24b, 24c through to 24 n with the number of keystations merely being limited by the capacity of the system and the desired processing time. With respect to the distribution of the functionality in the system of the present invention, the communication network 22 preferably does not really play a part in that it is transparent to transactional information. By this what is meant is that when the transactional information leaves the client site 26a, for example, it could be, if desired, encrypted or garbled in a way that the only other entity which could understand it would be the central system 20 and that would be irrelevant to the function of the network 22 since the network does not look at the messages, does not process the messages, and merely transfers these messages to the appropriate parts of the system, such as to the central system 20. In this regard, the network 22 is functioning similar to a paired cable in that it is a conduit to pass the information back and forth. Of course, the network 22 has various other communication functions which, however, for purposes of understanding the present invention are unnecessary to go into. Suffice it to say that preferably, the communication network 22 uses a protocol which can be termed hierarchal fan-out in which one node transmit to multiple nodes which in turn transmits to multiple other nodes. Thus, network 22 helps implement broadcast capabilities integrated with a message switching network to achieve full tolerance and broadcast distribution. It should be noted, when a match occurs, the central system 20 will preferably send directed messages or responses to all of those parties in the system that were involved in the match, so that, in some instances, two, three or more client site 26 maybe involved in receiving the directed message. However, this still differs from the broadcast message which is sent to all client sites irrespective of their involvement in a particular match.

Figure 2:
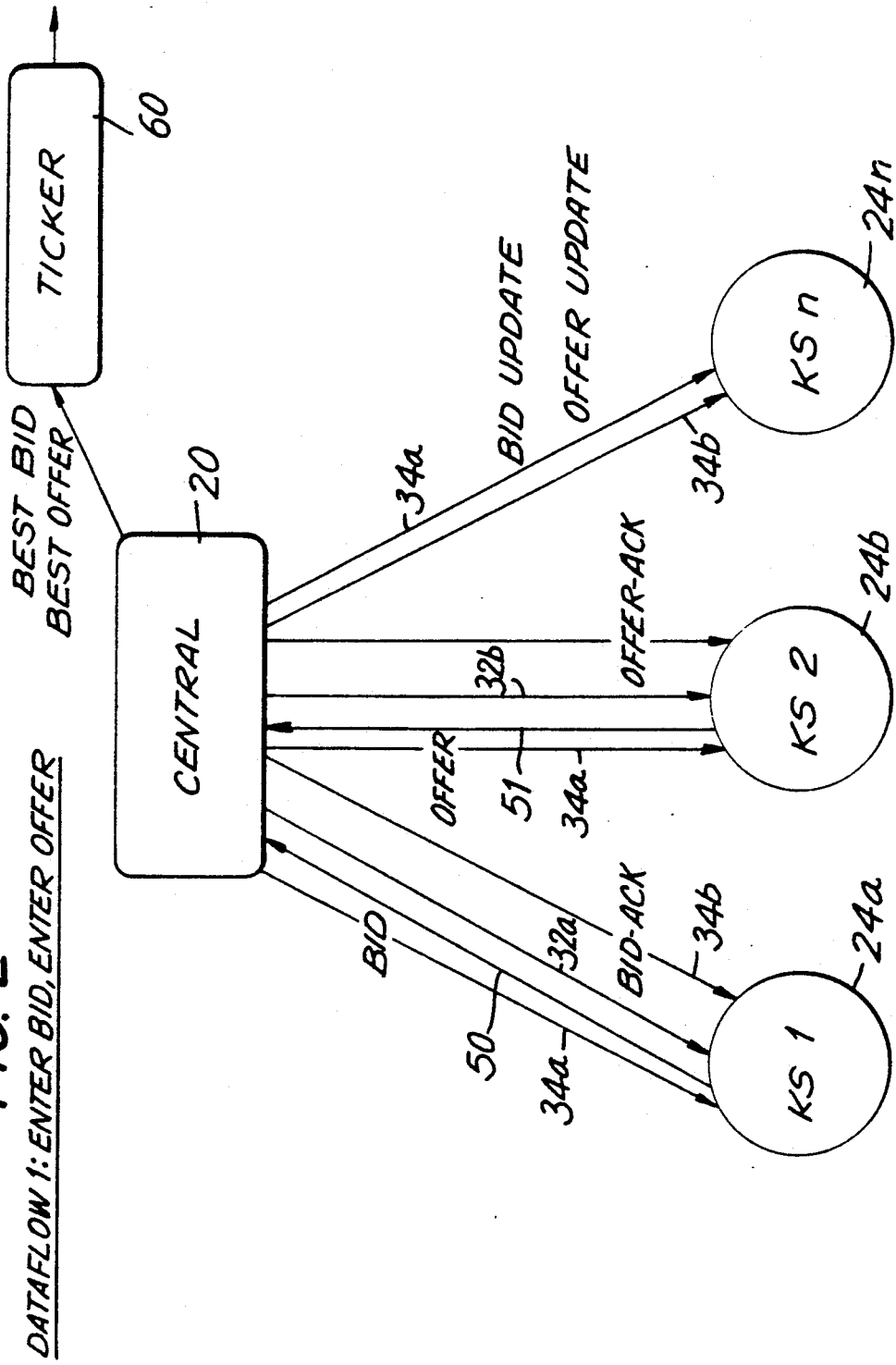
FIG. 2 is a functional block diagram of the system of FIG. 1 illustrating the flow of information in connection with the entry of a bid and the entry of an offer in the distributed matching system of FIG. 1.

Referring now to FIG. 2, this figure illustrates a typical data flow in accordance with the system of the present invention for entry of a bid or entry of an offer, with the network 22 being omitted since, as was previously mentioned, it is transparent to transactional information. First discussing the enter bid event in accordance with the system of the present invention, keystation 1 or 24a, submits a bid transaction to the central system 20. The directed message or directed response 32 which it receives back from the central system or host 20 is termed a bid acknowledgment or BID-ACK. This acknowledgment is a command acknowledgment which is preferably followed by an entry position message and is as was previously mentioned, is directed directly back to the keystation 24a. In addition, as shown and preferred in FIG. 2, a bid update message is broadcast by the central station 20 to all keystations in the system, such as represented by reference numeral 34a in FIG.2. This broadcast message 34a preferably occurs if this new bid 32a was the new best bid in the system, or was an additional quantity being bid at the best price in the system. Thus, if this new bid 32a is at the highest price or better or higher, then it will result in a bid update broadcast message 34a going out throughout the system. In addition, as also shown by way of example in FIG. 2, if it is desired to disseminate an external ticker 60, then the ticker information 60 will also be provided of the best bid or best offer. Preferably, the same procedure is followed with respect to entry of an offer with the messages, in this instance, being identified as offer, given reference numeral 51, offer acknowledgment or OFFER-ACK, given reference numeral 32b, and the broadcast message for offer update, being given reference numeral 34b.

Figure 3:
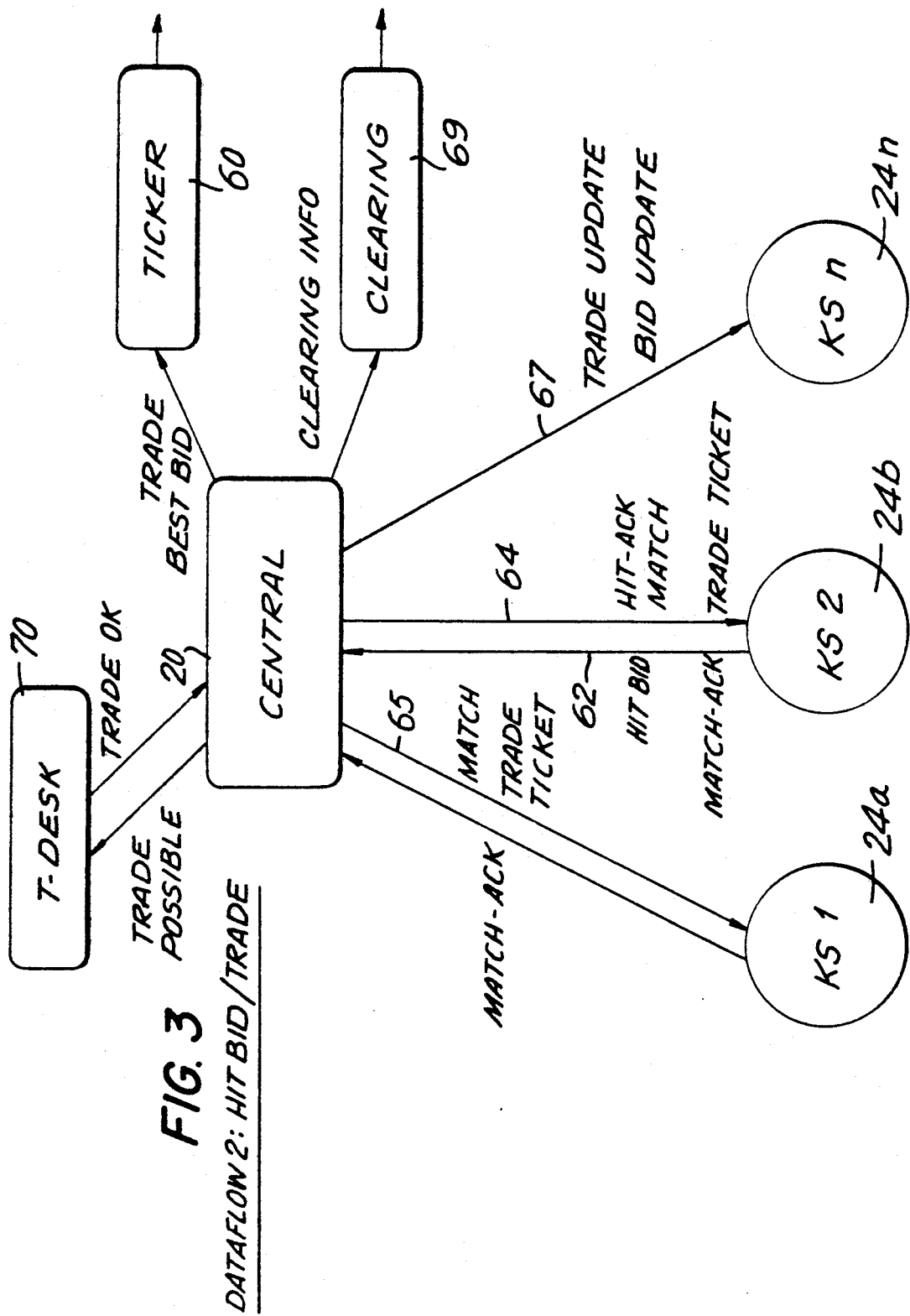
FIG. 3 is a functional block diagram similar to FIG. 2 of the flow of information in the distributed matching system of the present invention in connection with a hit bid or trade.

Referring now to FIG. 3, the data flow in accordance with the present invention is illustrated with respect to a situation in which there is a hit bid resulting in a trade. In this situation, there is substantially more activity than in the situation previously described with reference to FIG. 2. Thus, as shown and preferred in FIG. 3, if keystation 24b submits a transaction called "hit bid", represented by reference numeral 62, to the central station or host 20, a hit acknowledgment or HIT-ACK, represented by reference numeral 64, is provided back to keystation 24b as a directed message. At that point, the central system 20 will recognize that a match is possible because the "hit bid" message says that keystation 24b is willing to trade at the bid price. Assuming that credit is OK and does not play a role beyond that in this transaction, the central system 20 determines that a match is possible put, preferably, before committing to the match, it may get involved in a risk limiting protocol using a transaction desk 70 which determines whether the trade is possible, and if so, acknowledges this to the central system 20. Assuming that a trade is possible, then a match occurs. At that point several messages are generated from the central system 20. One of these messages is termed the match message, given reference numeral 65, which is a directed message that goes to the bidder, which in this instance is keystation 24b, and to the keystation 24a which originally owned the bid. Thus, in this instance, directed messages go to more than one keystation 24. Preferably, every match must be acknowledged so there is a match acknowledgment message, MATCH-ACK which comes back from the buyer and seller keystations 24b and 24a and is used to determine that the match was in fact received correctly and that the deal can be considered complete at that point. In addition, a broadcast message is generated that a trade has occurred which trade update message, given reference numeral 67, may possibly cause a new best bid to occur or could affect the quantity or price at the top of the book. Again, if the trades and best bids go into the ticker 60, then this information is provided to the ticker as well. Similarly, if clearing information is provided to a clearing house, this too occurs as represented by reference numeral 69. In addition, as shown and preferred, trade tickets may also be generated. Thus, trade ticket information is also preferably provided to the participating keystations 24a and 24b so that the trade tickets can be generated.

Figure 4:
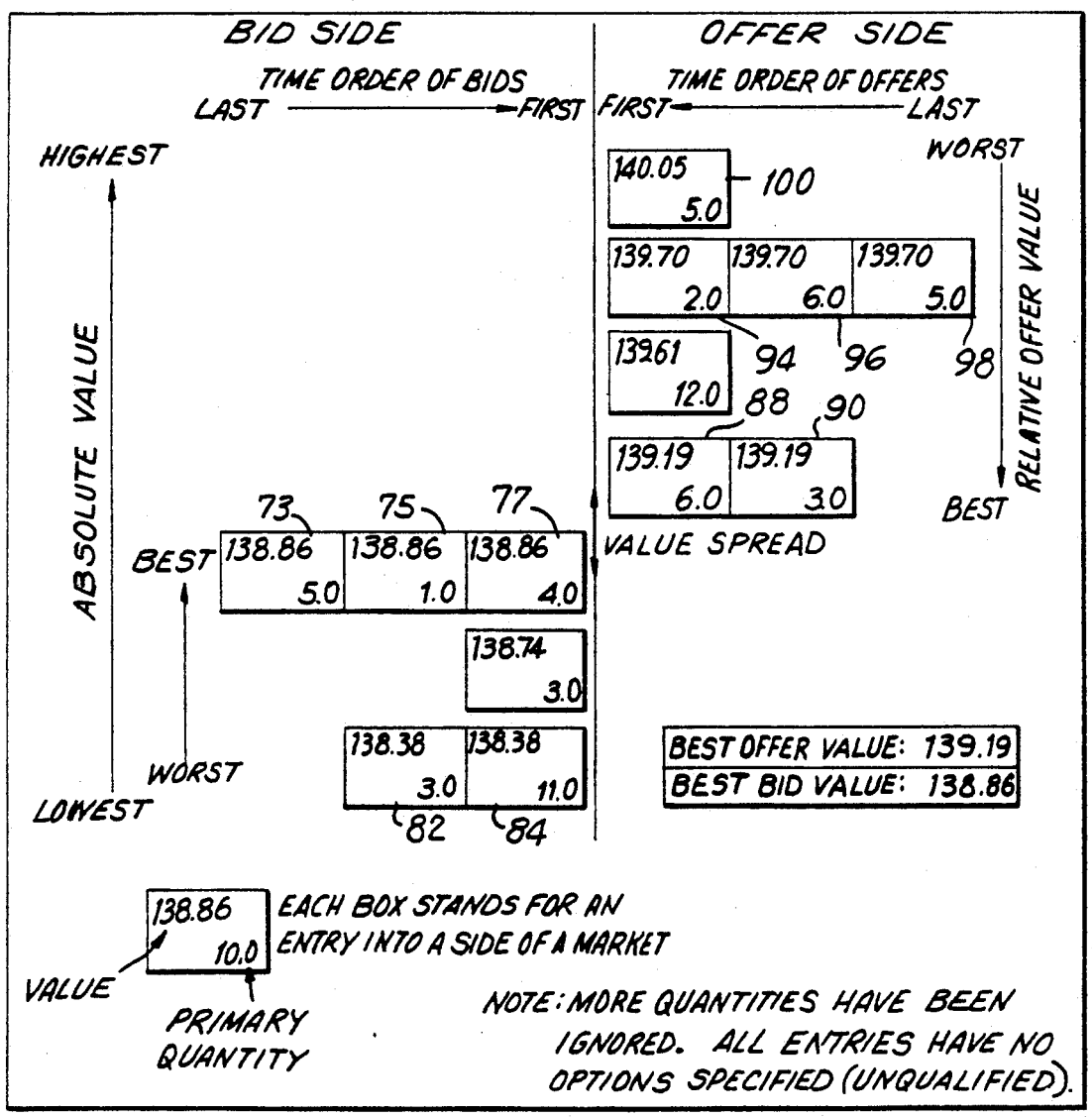
FIG. 4 is an illustrative diagram of a logical model of a book market, pre-posting, at the host or central system of the present invention and illustrates the central system book in accordance with the present invention.
Figure 5:
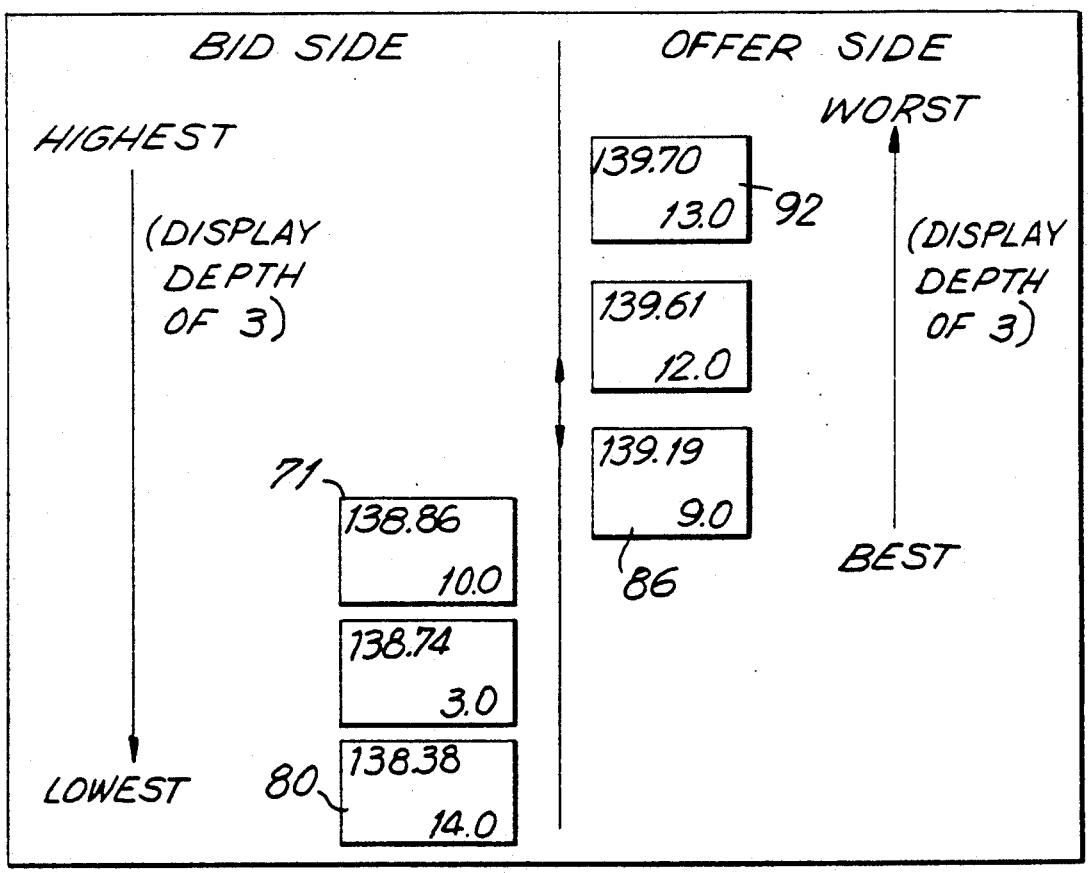
FIG. 5 is an illustrative diagram similar to FIG. 4 illustrating a typical keystation book as a subset of the central system book illustrated in FIG. 4.

Referring now to FIGS. 4 and 5, illustrations of typical books employed in the distributed matching system of the present invention are shown, with FIG. 4 illustrating a typical book at the central system 20 and FIG. 5 illustrating a typical keystation book at a typical keystation such as keystation 24a, based on the book of FIG. 4. The central station or host book illustrated in FIG. 4 is a logical model of the book market pre-posting and is divided into a bid side and an offer side. Each box in the diagram preferably stands for an entry into the side of the market. The value in the upper left hand corner of the box represents the price of the trading instrument and the value in the lower right hand corner represents the primary quantity of the trading instrument. As further shown and preferred in FIGS. 4 and 5, on the bid side the highest absolute value is at the top of the book and the lowest absolute value is at the bottom of the book, whereas on the offer side the worst relative offer value is at the top of the book and the best relative offer value is at the bottom of the book. In addition the time order of bids and offers goes from left to right with, on the bid side, the last bid being left most and the first bid being right most, whereas on the offer side, the first offer is left most and the last offer is right most. This convention is also followed in connection with the keystation book of FIG. 5 which is a subset of the system or central station or host book of FIG. 4. Thus, as can be seen in FIG. 5, the keystation books located at the client sites 26 maintain copies of the best bids and offers contained in the host book of FIG. 4 and use that information to generate displays at the keystations 24. In addition, as was previously mentioned, the display depth of the keystation book is controlled by the host computer 20. For example, in FIG. 5, a display depth of 3 is illustrated on the bid side and the offer side. It is this display depth which helps restrict the subset of the total depth of the book contained at the host computer or central system 20. In reality, there are two controls on the display depth, one is a central control by the host computer 20 which determines the maximum possible display depth for the keystation book, and the keystation 24 itself which, within that maximum parameter, can further limit the display depth of the book. Of course, the host computer also restricts the subset of the host book by limiting other information such as by withholding the identities of the parties until the transaction is completed and such other things as net together prices, and net together quantities. It should be noted that in the illustrative example of FIGS. 4 and 5, bids and offers of equal goodness are drawn on the same order down the line. The central system book maintained by the host contains detailed information from each client site on the particulars of each bid or offer. Preferably each bid and offer is identified with a token to give it a unique handle by which it can be referred to in future transactions and is time-stamped based on entry into the system. As further shown and preferred in FIG. 5, the keystation book is a summary book which contains accumulated summaries of bids at the same price and offers at the same price. Thus, by way of example, block 71 in FIG. 4 is a summary of blocks 73, 75 and 77 in FIG. 4, which shows a total quantity of 10 at the price of 138.86,, and block 80 is a summary of blocks 82 and 84 in FIG. 4 which shows a total quantity of 14 at the price 138.38. Similarly, on the offer side, block 86 is a summary of blocks 88 and 90 in FIG. 4, showing a total quantity of 9 at an offer price of 139.9, and block 92 is a summary of blocks of 94, 96 and 98, showing a total quantity of 13 at an offer price of 139.70. It should be noted that with respect to the offer side of FIG. 5, since the display depth is only three, the fourth worst offer represented by block 100 in FIG. 4 does not appear in the keystation book of FIG. 5 since it is outside the designated display depth range.

With respect to the user entry record maintained at the central database 20, preferably such items as the bidder offer indicator, the instrument ID number, the quote, the quantity, the time-stamp, the keystation transaction number, the host transaction number, etc. are maintained. If desired, different trading instruments may be quoted in different ways. For example, you may have some trading instruments quoted on the basis of absolute price and others on the basis of yield or discount, and so on. In addition, clearing information may be stored at the central system 20. As was previously mentioned, this type of information fully qualifies the entry to the host computer or central system 20 which can perform matching based on the collection of bids and offers that it has at any particular point in time, whereas the client site or keystation 24 preferably maintains copies of only some of these fields so that it can create displays. Thus, the host or central system 20 reduces the amount of network overhead that is required by transmitting only summary information about the book and typically restricts the price depths that are sent down, such as the depth of three given in the example of FIG. 5. In addition, as previously mentioned above, the host will aggregate quantities at the same price level as illustrated in FIG. 5. In allocating the accumulated summary to a match, the rules generally followed are that it goes by price, time of entry to the system, and by credit.

Now we shall briefly discuss the IXM update message structure for broadcast messages. IXM as used herein is another name for the book or an instrument crossed with a market. The book maintenance protocol or operation block protocol is preferably a way for instructing the client sites 26 to add, drop or remove particular sub-books from their associated book displays. Preferably, the host 20 enforces a structure on the client site data base which is a queue of prices whose maximum display depth is that display depth that the host enforces for that particular instrument. The IXM update message is a broadcast message which preferably contains a number of fields, such as the identifying information for the trading instrument that is being effected by this updated message, with the information being tokenized in order to minimize the bandwidth used on the network. Thus, very short numbers are used to indicate things like the trading instrument or the user or the subscriber that the system is trying to affect. In this instance, the IXM update message instructs the client site 26 to update the information being maintained in a particular instrument and contains an IXM token. As shown and preferred in FIGS. 7 and 8, the IXM update message contains a number of fields for providing the requisite summary information, such as the number of highs, lows, trades, etc., which information is used to key into the rest of the message. Preferably IXM updates are cummulative and apply to the then current state of the book maintained at the client site 26. Thus, the IXM update preferably contains new information about an IXM and the state in context of the instruments book. The message is preferably of variable length and may or may not contain certain information blocks. The IXM sequence number field preferably represents a number of updates to an IXM. The keystation 24 uses this value to preferably ensure that it receives all updates to an IXM and that it does not apply an outdated update. The block list size preferably defines how many information blocks are required for the IXM. Preferably the size of the operations list may exceed the maximum size of the message. In such an instance, the IXM is segmented across multiple messages. The number of highs specifies that a high quote is being sent, which typically would be only a one or zero. Similarly the number of lows specifics that a low quote is being sent, which would typically only be a one or a zero. The number of trades preferably specifies the length of the trade list for the message which is used for the last trade statistic as well as for support of the ticker. Typically the IXM image would only have, at most, a single trade block to indicate the last trade if there was one. The number of operations preferably specifies the length of the operation list for the message. If the block list size does not equal the sum of the number of highs, number of lows, number of trades, and number of operations, the IXM has been segmented across multiple messages. At least one IXM segment message will then preferably follow. When the sum of all the number of highs, lows, trades and operations fields across the segmented messages equal the block list size, then preferably the IXM data set is complete.

In order to get the book initially at the keystation, it is requested from the central system 20 during an initialization sequence. Thus, the first thing that a keystation 24 at a client site 26 does when it connects the network 22 and, thereby, through to the central system 20, is to request a download of all the currently active books. The host 20 then preferably sends a snapshot of each book and, from then on, the central system 20 will continue to send out updates on either a periodic basis or immediately after each change to indicate that the various items in the book have changed.

It should be noted that, preferably, with a single parameter change at the host system 20, effectively the view which the entire "world" or system population obtains with respect to a particular instrument is effectively changed. In this regard, if the host system 20 sets the display depth equal to one then, preferably, that means that no one can look into the book and that the host will not send out updates off of the best price display. This display depth can, of course ,be dynamically changed by the host on a daily basis or on any other periodic basis desired to provide centralized control over the distribution of the book. It should be noted that preferably all of the data in the system is logical data; that is all of the fields have meaning to the system.

In this regard, in order to understand the distributed book structure of the present invention, it should be understood that a book as used herein is the repository for bids/offer information on a particular trading instrument. Depending where that book is maintained, the sort of information that goes into it is going to be different so that the repository for bid/offer information on a given financial instrument, such as Japanese Yen, in the host 20 contains things like individual bids and offers, their identities, the clearing information and all of that maintained in strict price/time priority; whereas the book on Japanese Yen maintained at the client site 26 preferably contains some summary information about the total quantity bid and offered at a particular price, and does not contain all bids and offers, it only contains the ones that are appropriate.

There are actually two collections of information which are being maintained at the client site 26. One of these collections of information is the book for each instrument which is maintained at the keystation 24 sites which have been given reference numerals 110, 112, by way of example in FIG. 6. Another book maintained at each site is the local entry data base or order book which has been given reference numerals 114 and 116 in FIG. 6. As previously mentioned, there is also the host or system book database, given reference numeral 118 in FIG. 6. Each time a client site 26 starts up as a keystation 24, as was previously mentioned, the keystation 24 is preferably initially empty and requests the download of the currently active books from the central system 20. As was previously mentioned, separate books are maintained for each trading instrument, so there would be a separate book for Japanese Yen, a separate book for Deutsch Mark, a separate book for dollars, etc., assuming that the system of the present invention was used for trading foreign exchange currencies. Each of these books would be maintained at a given display depth. In this regard, it should be noted that an IXM update broadcast message is only broadcast when the price information is inside the assigned display depth that has been assigned by the host computer or central system 20. With respect to the local entry database or order books 114, 116, these order books 114, 116 are updated by directed messages from the central system 20 and/or record the orders of the particular keystation 24b or 24a which have been sent to the central system 20. In this regard, these order books 114, 116 are preferably kept current so that it is a listing only of orders which are still present in the central system 20 from the respective keystations 24b or 24a. This order database 114 and 116 gets modified, such as through the removal of data, due to various occurrences, such as when a complete match has occurred for a given order an entry remove message is provided, or if it is partial match you may get an entry message that tells you that only that a partial match has been done against that order. The match notification which was previously referred to preferably refers to a particular order that is contained in the order database 114 or 116 and indicates what quantity or portion of the order has been matched. If all of the order has been matched, the entire order is then preferably deleted from the respective order database 114 or 116. By way of example, if a bid were put in for ten million Yen at a price of 127 and the display was enabled, that is the display depth was set to something greater than or equal to one, then the central system 20 would preferably construct a broadcast message, which is the aforementioned IXM update broadcast message, which would inform all client sites 26 that a new bid had been added to the Yen book, assuming that were the instrument being traded. The IXM update message would instruct an operation block which would say add to index one the ten million at 127. As for the other parameters in the IXM update message, add index would equal one, type would equal bid, quote would equal 127 and quantity would equal ten million. In the above example, the transaction achieves two functions. The first function it achieves is that a bid is submitted and the host system 20 responds to the keystation 24a submitting the bid that the bid was accepted and that there was no ambiguity in that the bid is definitely in the system 20, the system 20 has it, and the local entry database 116 has it. The other function indicates that the bid was of a certain characteristic that the rest of the "trading world" in the system should know about and this is accomplished as a result of the IXM broadcast message which was generated to all of the client sites 26 which were then told about this in summary as opposed to being given all of the detailed information. It should be noted that, as previously mentioned, in terms of functional operation, the entry of a bid to the system is the same as entry of an offer.

In the situation when a trade occurs, this means that a matching offer is present in the system, the host system 20 has accepted that matching offer, and sends back the acknowledgment command, in effect retrieving the existing book on Yen, in the above example, finds out that there is ten million Yen at 127 in the book, adds to that the newly entered fifteen million at 127, and is aware that it has positioned fifteen million at 127. The host 20 then does the match up including that ten million and does the trade, taking out the existing bid, so it reduces that amount to zero million at 127 leaving over five million at 127 on the offer side. In this instance, as will be explained with reference to FIG. 6, at least two directed messages have been sent, actually four having been transmitted to the client sites 26 that are involved in the trade. The seller will get an indication that his Yen bid has traded by means of a match notification and he will, thereafter, be informed who the counterparty was after the match has been made. The clearing and settlement of the trade will then preferably be the responsibility of the subscribers. The counterparty who originally transmitted the offer and entry position message saying that it had a Yen offer Positioned greater than the bid will then get an entry positioned Yen offer at five million at 127 and will get a match notification saying that, with respect to his offer, ten million of his original fifteen million has traded with the party who will then be identified Lastly, the IXM update broadcast message will be constructed and broadcast to all client sites 26 to update the trading book. That update message will preferably, in the above example, contain two operation blocks, one which will remove the bid information from the client book and the second which will post the new five million offer which remains on the offer side and will show that a trade took place. In addition, as was previously mentioned, if desired, ticker information will also be provided in the IXM update message saying what traded, keeping track of the cummulative volume, the net change, the number of changes, the high limits, the low limits and so forth. It should be noted that preferably only the keystation 24 that either executed the transaction or was involved somehow in that transaction will receive the directed message with respect thereto and not other keystations 24 at the same client site 26, whereas with respect to broadcast messages all keystations 24 at all client sites 26 receive these messages. If desired, with respect to credit, which does not form part of the present invention herein, this can be controlled on a client site 26 by client site 26 basis as opposed to a keystation 24 basis. Thus, in the system of the present invention, the network 22 has two functions, one of which is directed message delivery and the other of which is broadcast message delivery.

Referring now to FIG. 6 in greater detail, the network 22 which, as was previously mentioned, is transparent to transactional information has been omitted for purposes of explanation of the message flow in the system of the present invention. For purposes of the example of FIG. 6, keystation 24a can represent any keystation which originates a transaction and keystation 24b can represent any keystations which are involved as counterparties in the transaction which, as was previously mentioned can be more than one keystation at more than one location. The keystations 24a and 24b are normally remotely located from each other such as, for example, keystation 24a being in New York and keystation 24b being in London. In addition, the keystations 24a and 24b are remotely located from the central system 20. In order to understand the message flow illustrated in FIG. 6, we will assume that the originating keystation 24a is receiving a display of the keystation book database located at keystation 24a. Assuming that the operator at that keystation 24a then desires to enter a bid or an offer, either of which will be termed an order, this information is input to the keystation 24a via conventional means, such as a keyboard or a mouse by way of example. The keystation 24a then preferably validates the order and maintains its local order data base or local entry data base 116. The order, instead of being a bid or an offer, could be a hit or a take for a particular trading instrument as well since all of these various items would constitute an entry of an order. After the order has been entered, validated, and, the order data base 116 maintained, a transaction message is built and sent as a directed message to the central system 20. This is represented by reference numeral 120 in FIG. 6. This transaction message 120 is received by the central system 20 and contains transaction information. At this point, preferably the central system 20 sends back a directed message, termed a command acknowledgment message and given reference numeral 122, to inform keystation 24a that the transaction message 120 has been received. The transaction message 120 is time-stamped by the central system 20 at this point. Preferably the display of keystation 24a will indicate "please wait" until the transaction message 120 has been acknowledged. Preferably, such acknowledgment happens relatively quickly, such as in about two seconds, by way of example. The central system 20 then preferably processes the transaction message 120 against the central system 20 stored copy of the system or host book which is contained in the host book data base 118. At this point, the central system 20 preferably either adds the entry of the transaction or the order from keystation 24a to the host book data base 118 or matches that entry against existing bids and offers contained in the host book data base 118. Once that processing is completed, the central system 20 is ready to generate output messages not only to the originating keystation 24a, but possibly to other keystations 24 such as the counterparty keystations represented by 24b and, assuming that an update message is required, to all keystations in the system. Thus, central system 20 generates directed messages back to each of the keystations 24 involved in the matching transaction, such as 24a as the originating keystation and, assuming that there is a match, 24b as the counterparty keystation, and generates the IXM update broadcast message to all keystations 24. It should be noted that, as previously mentioned, a single transaction message 120 from keystation 24a, whether it is a hit, or a take, or a bid, by way of example, could result in multiple matches. For example, if keystation 24a wants to hit the bid for a quantity of 20, it is possible that to satisfy that order more than one match could be involved such, as for example, four or five different matches, particularly, since the keystation book at keystation 24a merely displays accumulated summaries of the bids or offers, such as represented by blocks 71, 80, 86 and 92 in FIG. 5. If multiple matches occur, then, thereafter, the identity of all of the counterparties involved in the multiple matches are displayed on the screen of the originating keystation 24a for a settlement purposes. Thus, on any given transaction, there will always be directed messages involving the transaction originator and involving one or more counterparties or affected parties in that trade or transaction. If the market is an auction market, then it preferably has a price depth of one so that this determines how many prices the central system 20 can maintain with only one price being maintained in an auction market. When a new bid goes in which betters the existing bid in an auction market, the existing bid is actually removed and effectively cancelled in the book. By way of example, an auction market is represented by FIGS. 15 and 16. Preferably, after all of the directed messages are generated to the counterparties, and the associated directed message acknowledgments, such as represented by reference numerals 124, 126, 128 and 130 in FIG. 6, the IXM update broadcast message, represented by reference numeral 132 in FIG. 6, is sent to all keystations 24 in the system regardless of whether or not they were involved in this particular matching transaction. It should be noted that preferably the first six steps illustrated in FIG. 6 with respect to the central system 20 are all essentially a-synchronous to any outside events. When the keystations 24a and 24b received the update broadcast message it will be processed against the local keystation book database 110, 112 and the local copy of the book will be maintained. As was previously mentioned, it should be noted that this local keystation book 110, 112 is not an exact carbon copy of the central system book 118 but rather is only a selected subset of it which comprises an accumulated summary of bids and offers within the assigned display depth. Thus, preferably, FIG. 6 illustrates a generic template for the processing of messages throughout the system of the present invention in order to provide the distributed functionality of the system.

It should be noted that the concept of originating keystation and counterparty keystation moves around with each transaction so that for each transaction the originator may be different and may for different transactions occurring at the same time be an originating keystation in one instance and a counterparty keystation in another instance. In addition, there are other instances in which the keystation may merely be a bystander and not involved in the particular transaction at all. Preferably the control of the overall distributed matching system is maintained by the central system 20 which operates in accordance with a set of rules which govern how the transactions are processed. Preferably, the central system processes transactions against a particular trading instrument in time order of entry into the system. In this regard it should be noted that it is not time entry of orders per se but time entry of orders related to a particular trading book or trading instrument. Thus, there would be time order entry assigned to Yen, a different time order entry consideration assigned to Deutsch Marks, and so forth if the trading instruments were foreign exchange currencies.

Figure 13:
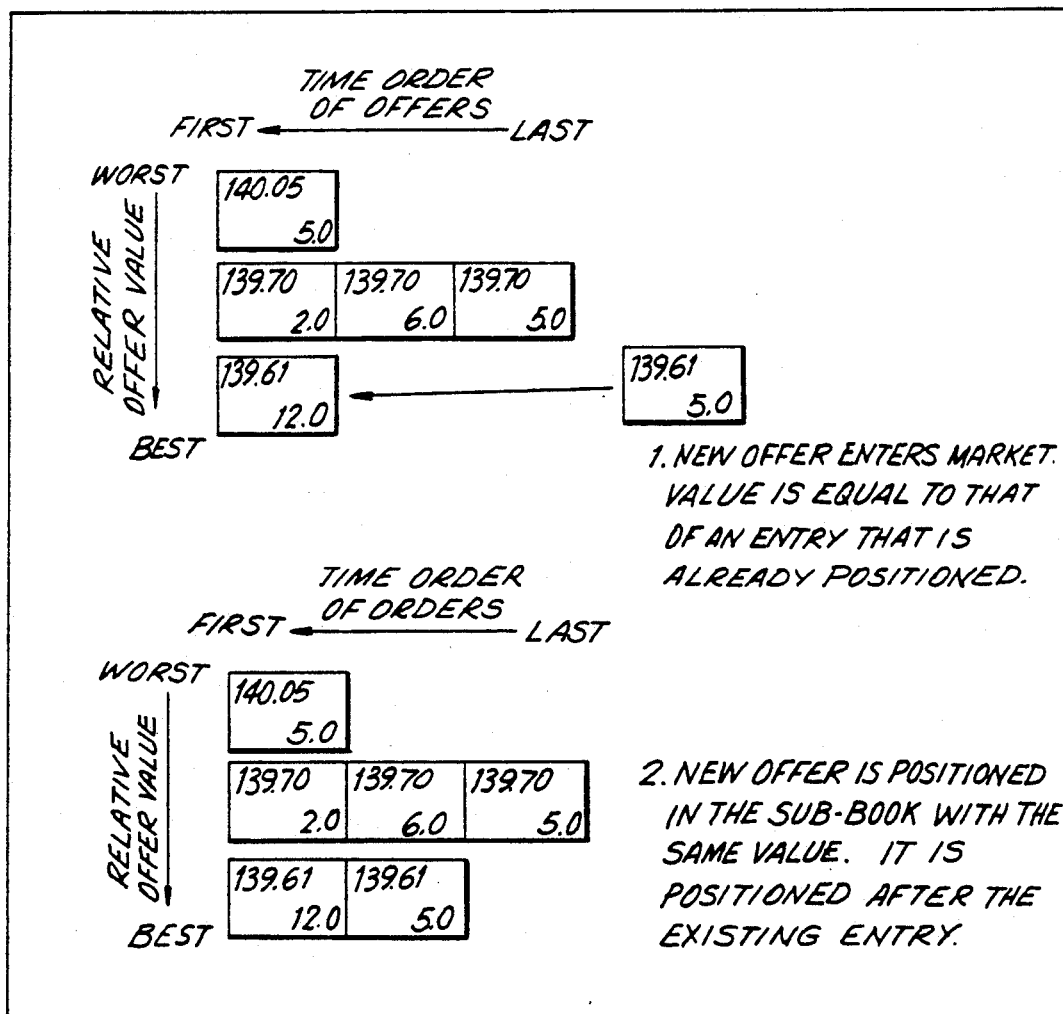
FIG. 13 is an illustrative diagram similar to FIG. 4, illustrating a book market entry position, at market, based on the example of FIG. 4.
Figure 14:
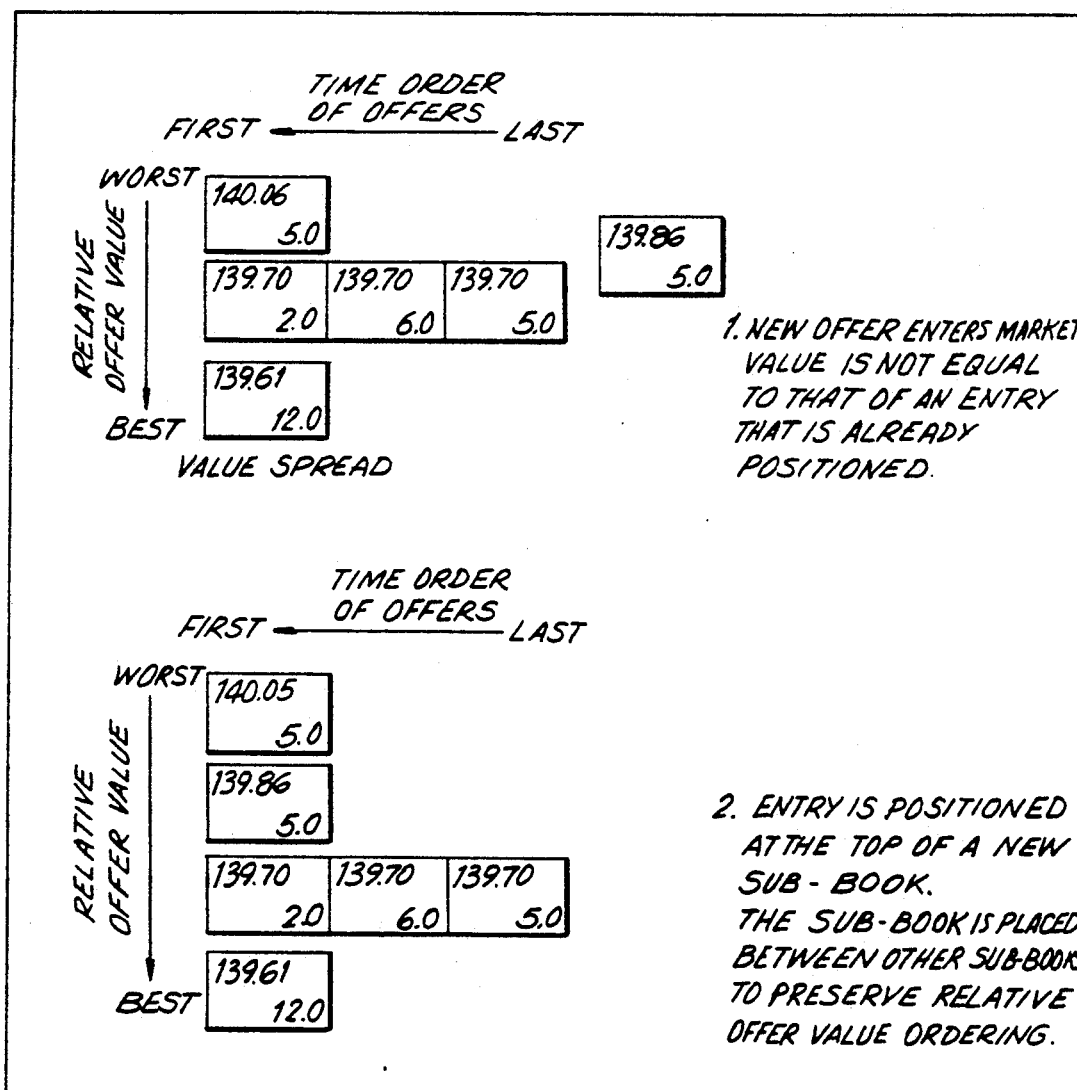
FIG. 14 is an illustrative diagram similar to FIG. 4 of book market entry position, with the creation of a new sub-book based on the book illustration of FIG. 4.
Figure 17:
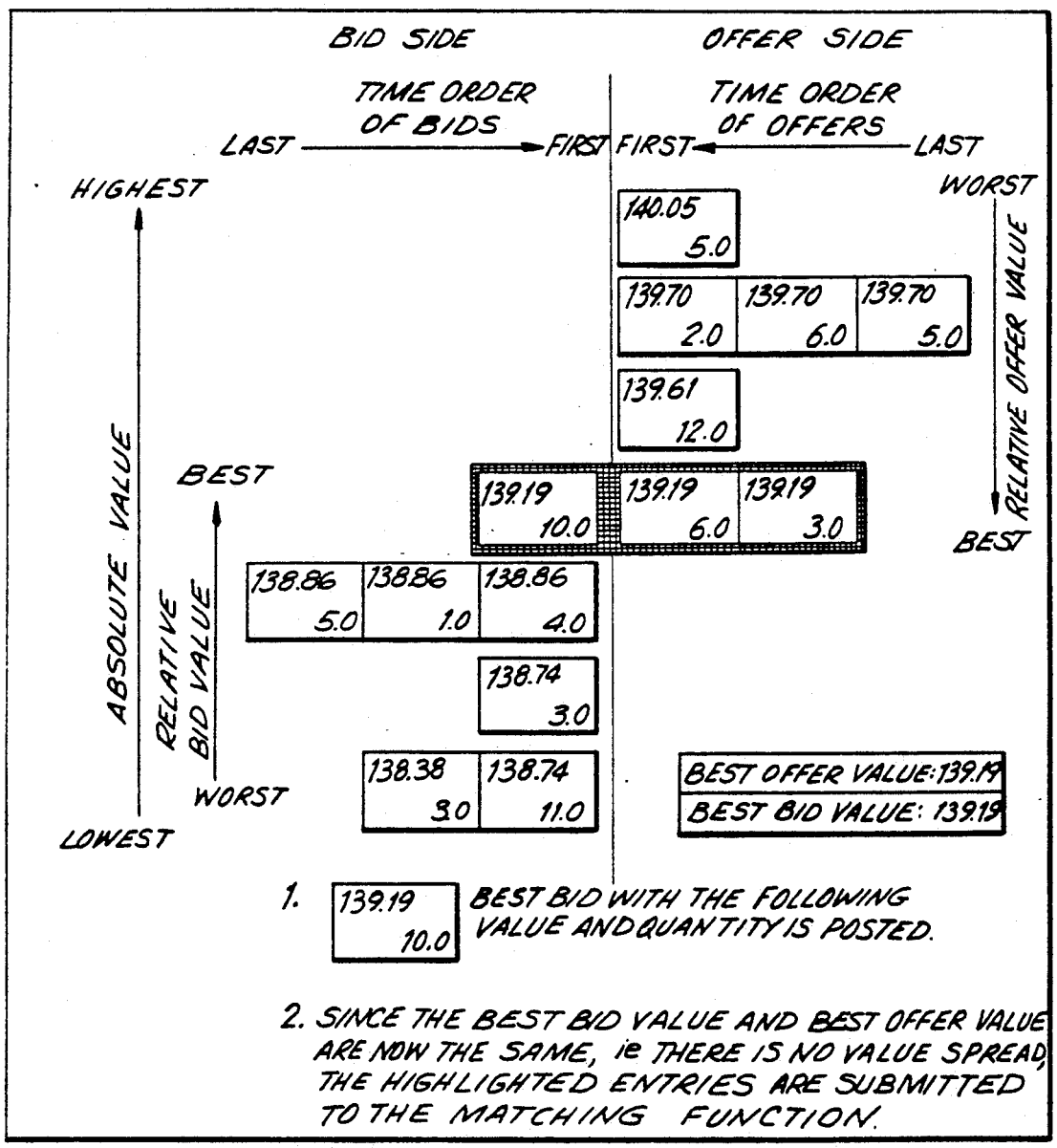
FIG. 17 is an illustration of a logical model of the book market, similar to FIG. 4, after posting.
Figure 18:
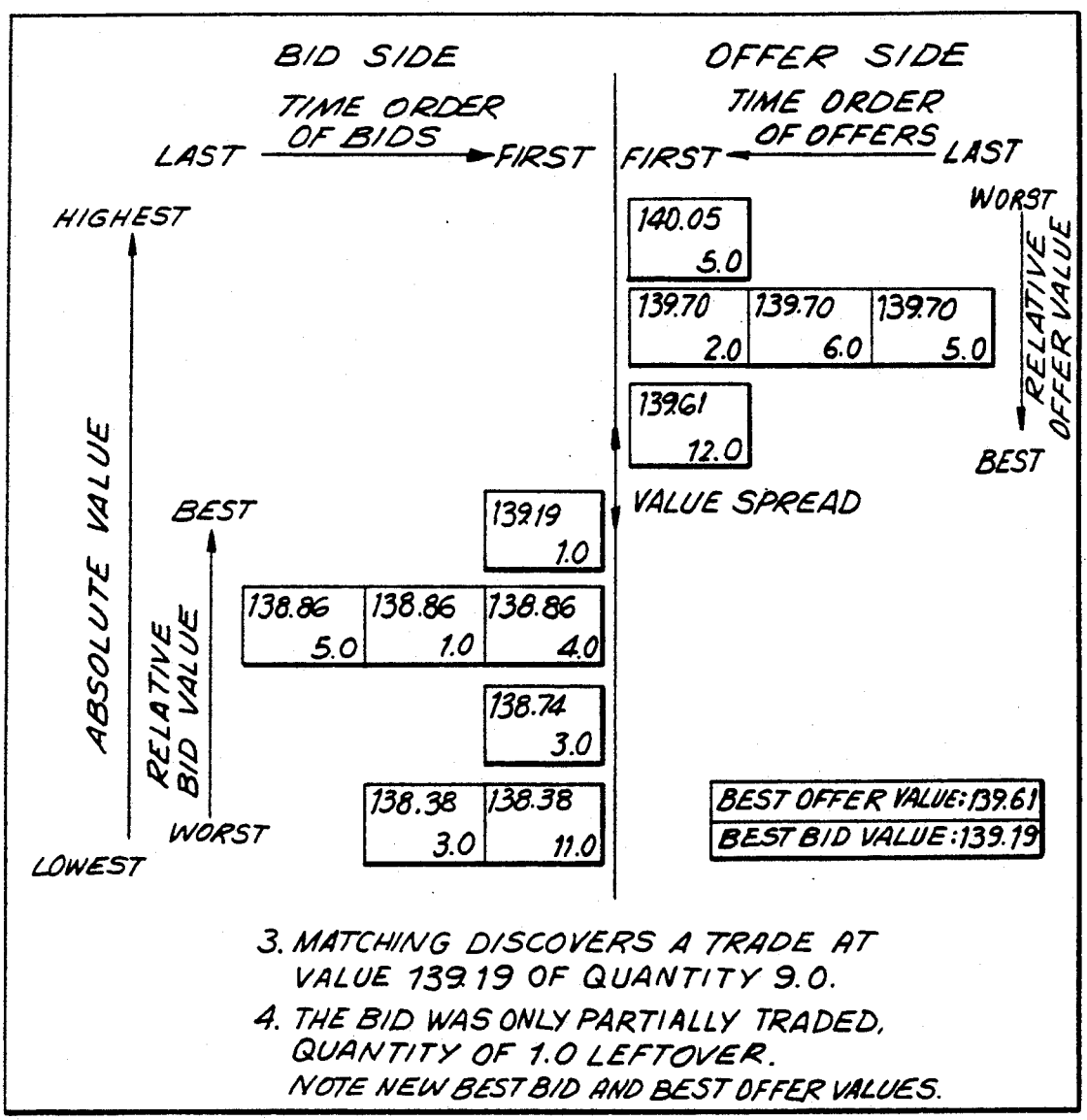
FIG. 18 is an illustrative diagram similar to FIG. 4 of the logical model of the book market of FIG. 4 after trade.

By way of example, FIGS. 13, 14, 17 and 18 are further illustrations of the book market, with FIG. 13 illustrating the book market entry position, at market, at the central data base; FIG. 14 illustrating the book market entry position for creation of a new sub-book; FIG. 17 illustrating a logical model of a book market after posting of a trade; and FIG. 18 illustrating a logical model of the book market after the trade. Preferably each side of the book market is made up of zero or more sub-books. In the example of FIG. 4, there are seven sub-books, four on the offer side and three on the bid side. Preferably there are two ways in which an entry can be positioned in a book market, both determined by the entry's value. If there exists a sub-book that has the same value as the new entry, the new entry is entered at the bottom of the sub-book, such as illustrated in FIG. 13. When the new entry equals the current best entry for the side of the market, the entry behaves in this fashion. If a sub-book with the same value as the new entry does not exist, then a new sub-book is created with the new entry placed at the top of the book, such as illustrated in FIG. 14. This sub-book is preferably positioned between other sub-books so that the value ordering of the sub-books is preserved. Preferably by definition a best entry does not have a value equal to that of any existing sub-book for that side of the market. A new sub-book is implicitly created when the new entry betters the current best price for that side of the market.

The behavior of an auction market, such as illustrated in FIGS. 15 and 16, is preferably dictated by the fact that there are at most one sub-book per side of a market. When an entry is worse than the current best entry, it is preferably rejected from the market. When an entry equals the current best entry, it is preferably accepted into the market and is positioned as the last entry in time order in the appropriate sub-book, such as shown in FIG. 15 by way of example. When an entry betters the existing value for the side of a market, the current entries in that side of the book are preferably cancelled, such as shown in FIG. 16 by way of example.

Referring once again to FIG. 17 and 18, matching is only attempted, preferably, when the posting function indicates that the best bid value is better than or equal to the best offer value. The matching function is preferably the same for both book markets and auction markets. In a book market, it is possible for any order to cross the market; that is, for a new bid to be higher than the best offer or a new offer to be lower than the best bid. In this case, trades are preferably allowable at multiple quotes filling the order starting at the best quote and working down to the quote specified in the new order as necessary to trade as much quantity as possible. Since the quote depth for an auction market is only 1, just the bid side and the offer side of a market are submitted to matching. If one or more matches are found, the following information is preferably given for each matching pair; namely, the buyer, the seller, the instrument, the quantity traded and the quote. As is shown by way of example in FIG. 17, there is a bid which has been introduced at the value of 139.19, a value that betters the current best bid. Since there exists no sub-book on this price on the bid side of the book, a new one is created. At this point, the best bid value is equal to the best offer value so the bid and offer sub-books with the value of 139.19 are submitted to the matching function. Both of the offer entries are fully traded for a trade total quantity of nine. The bid is only partially traded and a quantity of one remains. It should be noted that with respect to FIG. 4, there are seven sub-books in the market, three on the bid side and four on the offer side with a value spread between the bid side and the offer side of the market currently existing so that no matching could take place at that time. FIG. 18 illustrates the logical model of the book market after the trade is over. In this instance the offer sub-book with a value of 139.19 in the above example has no more entries in it so the sub-book is removed. There is a bid remaining at that quantity so it remains in the sub-book. A new value spread now exists in the book.

Thus, with the system of the present invention, the books may be distributed among the keystations through the use of summary books so that information is distributed between the central system 20 and the keystations 24 in such a way that all of the right information, and only the right information, is made available at the geographically dispersed keystations. The keystations 24 need information to generate their displays which displays, in the system of the present invention, can be as up to date as possible so that the traders are provided with accurate information regarding the instruments available for trade while the keystations 24 are prevented from receiving disclosure information that they are not entitled to or that should be withheld from them because it is an anonymous trading system. Thus, not only does the distributed matching system of the present invention provide for efficient transmission of information but it enables the host to controllably mask the available trading market.

What is claimed is:

1. A matching system for trading instruments in which bids are automatically matched against offers for given trading instruments for automatically providing matching transactions in order to complete trades for said given trading instruments, said system comprising a host computer means for maintaining a host book database comprising all of the active bids and offers in the system by trading instrument; a transaction originating keystation means for providing a bid on a given trading instrument to said system for providing a potential matching transaction; and network means for interconnecting said host computer means, said transaction originating keystation means and said counterparty keystation means in said system for enabling data communications there between, both said transaction originating keystation meand and said counterparty keystation means for said potential matching transaction each having an associated local database keystation book having an associated data storage structure and comprising a subset of said host book, said host computer means dynamically determining said local data base data storage structure, the content of each of said keystation books having an associated display depth range dynamically controllable by said host computer means and being dynamically updatable by transaction update broadcast messages received from said host computer means through said network means, said transaction originating keystation means and said counterparty keystation means comprising means responsive to said received transaction dynamic update broadcast messages for updating said associated keystation books and further comprising means for providing directed messages to said host computer means corresponding to said bid and said offer, respectively, said directed messages updating said host book, said host computer means comprising means for conditionally providing said transaction broadcast update messages to said keystation means in response to the presence of an update condition, said update condition comprising updating of said host book and said received bid or offer having a relative value compared with other bids or offers within said host book which is within said keystation book dynamically controllable display depth range of relative values; whereby controllable subsets of a distributable system trading book may be selectively provided to trading keystations in said matching system from the host for dynamically controllably masking the available trading market.

2. A matching system in accordance with claim 1 wherein said host computer means comprises means for processing said matching transactions for a given trading instrument in time order entry to said matching system.

3. A matching system in accordance with claim 1 wherein said subset keystation books comprise accumulated summaries of corresponding bids and offers in said host book.

4. A matching system in accordance with claim 3 wherein said keystation means responsive to said received transaction update broadcast messages comprises means for updating said accumulated summaries in response thereto.

5. A matching system in accordance with claim 4 wherein said accumulated summaries comprise an accumulation of common price bids and an accumulation of common price offers.

6. A matching system in accordance with claim 3 wherein said accumulated summaries comprise an accumulation of common price bids and an accumulation of common price offers.

7. A matching system in accordance with claim 1 wherein said bids and offers comprise logical data.

8. A matching system in accordance with claim 7 wherein said host computer means comprises means for processing said matching transactions for a given trading instrument in time order entry to said matching system.

9. A matching system in accordance with claim 7 wherein said subset keystation books comprise accumulated summaries of corresponding bids and offers in said host book.

10. A matching system in accordance with claim 9 wherein said keystation means responsive to said received transaction update broadcast messages comprises means for updating said accumulated summaries in response thereto.

11. A matching system in accordance with claim 10 wherein said accumulated summaries comprise an accumulation of common price bids and an accumulation of common price offers.

12. A matching system in accordance with claim 9 wherein said accumulated summaries comprise an accumulation of common price bids and an accumulation of common price offers.

13. A matching system in accordance with claim 1 wherein said network means comprises means transparent to the transactional data associated with said matching system.

14. A matching system in accordance with claim 13 wherein said host computer means comprises means for processing said matching transactions for a given trading instrument in time order entry to said matching system.

15. A matching system in accordance with claim 13 wherein said subset keystation books comprise accumulated summaries of corresponding bids and offers in said host book.

16. A matching system in accordance with claim 15 wherein said keystation means responsive to said received transaction update broadcast messages comprises means for updating said accumulated summaries in response thereto.

17. A matching system in accordance with claim 16 wherein said accumulated summaries comprise an accumulation of common price bids and an accumulation of common price offers.

18. A matching system in accordance with claim 15 wherein said accumulated summaries comprise an accumulation of common price bids and an accumulation of common price offers.

19. A matching system in accordance with claim 13 wherein said bids and offers comprise logical data.

20. A matching system in accordance with claim 1 wherein said keystation means comprises display means for displaying said associated keystation book.

21. A matching system in accordance with claim 20 wherein said keystation book comprises displayable data having said keystation book display depth range, whereby bids and offer outside said display depth range are not displayed.

22. A matching system in accordance with claim 20 wherein said host computer means comprises means for processing said matching transactions for a given trading instrument in time order entry to said matching system.

23. A matching system in accordance with claim 22 wherein said keystation book comprises displayable data having said keystation book display depth range, whereby bids and offer outside said display depth range are not displayed.

24. A matching system in accordance with claim 20 wherein said subset keystation books comprise accumulated summaries of corresponding bids and offers in said host book.

25. A matching system in accordance with claim 24 wherein said keystation book comprises displayable data having said keystation book display depth range, whereby bids and offer outside said display depth range are not displayed.

26. A matching system in accordance with claim 20 wherein said keystation means responsive to said received transaction update broadcast messages comprises means for updating said accumulated summaries in response thereto.

27. A matching system in accordance with claim 26 wherein said keystation book comprises displayable data having said keystation book display depth range, whereby bids and offer outside said display depth range are not displayed.

28. A matching system in accordance with claim 20 wherein said accumulated summaries comprise an accumulation of common price bids and an accumulation of common price offers.

29. A matching system in accordance with claim 28 wherein said keystation book comprises displayable data having said keystation book display depth range, whereby bids and offer outside said display depth range are not displayed.

30. A matching system in accordance with claim 20 wherein said bids and offers comprise logical data.

31. A matching system in accordance with claim 30 wherein said keystation book comprises displayable data having said keystation book display depth range, whereby bids and offer outside said display depth range are not displayed.

32. A matching system in accordance with claim 1 wherein said keystation books each comprise a restricted subset of the total depth of said host book with respect to the best bids and offers present in said host book database.

33. A matching system in accordance with claim 32 wherein said host computer means comprises means for processing said matching transactions for a given trading instrument in time order entry to said matching system.

34. A matching system in accordance with claim 32 wherein said subset keystation books comprise accumulated summaries of corresponding bids and offers in said host book.

35. A matching system in accordance with claim 34 wherein said keystation means responsive to said received transaction update broadcast messages comprises means for updating said accumulated summaries in response thereto.

36. A matching system in accordance with claim 35 wherein said accumulated summaries comprise an accumulation of common price bids and an accumulation of common price offers.

37. A matching system in accordance with claim 34 wherein said accumulated summaries comprise an accumulation of common price bids and an accumulation of common price offers.

38. A matching system in accordance with claim 32 wherein said display depth of one for said keystation books prevents looking into said host book at said keystations.

39. A matching system in accordance with claim 1 wherein said keystation books bids and offers are anonymous prior to completing said matching transaction.

40. A matching system in accordance with claim 1 wherein said data communication is via user tokens in said system.

41. A matching system in accordance with claim 1 wherein said display depth of one for said keystation books prevents looking into said host book at said keystations.

42. A matching system in accordance with claim 1 wherein each of said associated keystations means further comprises an order book, said order book comprising the orders being maintained by said associated keystation means in said system, said order book being updatable in response to directed messages form said host computer means.

43. A matching system in accordance with claim 1 wherein said given trading investments comprise foreign exchange currencies.

44. A matching system in accordance with claim 43 wherein said host computer means comprises means for processing said matching transactions for a given trading instrument in time order entry to said matching system.

45. A matching system in accordance with claim 43 wherein said subset keystation books comprise accumulated summaries of corresponding bids and offers in said host book.

46. A matching system in accordance with claim 45 wherein said keystation means responsive to said received transaction update broadcast messages comprises means for updating said accumulated summaries in response thereto.

47. A matching system in accordance with claim 46 wherein said accumulated summaries comprise an accumulation of common price bids and an accumulation of common price offers.

48. A matching system in accordance with claim 45 wherein said accumulated summaries comprise an accumulation of common price bids and an accumulation of common price offers.

49. A matching system in accordance with claim 43 wherein said bids and offers comprise logical data.

50. A matching system in accordance with claim 43 wherein said network means comprises means transparent to transactional data associated with said matching system.

51. A matching system in accordance with claim 43 wherein said keystation means comprising display means for displaying said associated keystation book.

52. A matching system in accordance with claim 51 wherein said keystation book comprises displayable data having said keystation book display depth range, whereby bids and offer outside said display depth range are not displayed.

53. A matching system in accordance with claim 43 wherein said keystation books each comprise a restricted subset of the total depth of said host book with respect to the best bids and offers present in said host book database.

54. A matching system in accordance with claim 43 wherein said keystation book bids and offers are anonymous prior to completing said matching transaction.

55. A matching system in accordance with claim 43 wherein said data communication is via user tokens in said system.

56. A matching system in accordance with claim 43 wherein said display depth of one for said keystation books prevents looking into said host book at said keystations.

57. A matching system in accordance with claim 43 wherein each of said associated keystations means further comprises an order book, said order book comprising the orders being maintained by said associated keystation means in said system, said order books being updatable in response to directed messages from said host computer means.

* * * * *

UNITED STATES PATENT AND TRADEMARK OFFICE
CERTIFICATE OF CORRECTION

PATENT NO. : 5,077,665
DATED : December 31, 1991
INVENTOR(S) : David L. Silverman et al It is certified that error appears in the above-indentified patent and that said Letters Patent is hereby corrected as shown below:

Column 3, line 15: After "which", delete "in" and insert --is--.
Column 4, line 57: After "now," delete "to", second occurrence.
Column 6, line 30: After "node", delete "transmit" and insert --transmits--.
Column 9, line 66: After "lows", delete "specifics" and insert --specifies--.
Column 12, line 22: After "identified" insert a period --.--.

Signed and Sealed this

Fourteenth Day of September, 1993

Attest:

Attesting Officer

BRUCE LEHMAN

Commissioner of Patents and Trademarks